(12) United States Patent
Redekop et al.

(10) Patent No.: US 7,220,179 B2
(45) Date of Patent: May 22, 2007

(54) COMBINE HARVESTER WITH READY ADJUSTMENT OF DISCHARGE POSITIONS OF STRAW AND CHAFF

(75) Inventors: Leo Redekop, Saskatoon (CA); Kevin Redekop, Saskatoon (CA); Dean Mayerle, Saskatoon (CA)

(73) Assignee: Redekop Chaff Systems Ltd., Saskatoon, Saskatchewan (CA)

( * ) Notice: Subject to any disclaimer, the term of this patent is extended or adjusted under 35 U.S.C. 154(b) by 7 days.

(21) Appl. No.: 11/217,066

(22) Filed: Sep. 1, 2005

(65) Prior Publication Data

US 2006/0073860 A1    Apr. 6, 2006

Related U.S. Application Data

(63) Continuation-in-part of application No. 11/148,441, filed on Jun. 9, 2005, now abandoned.

(51) Int. Cl.
*A01F 12/40* (2006.01)
(52) U.S. Cl. ...................................... 460/112
(58) Field of Classification Search ................ 460/112, 460/111; 56/504, 500; 241/186.2, 186.3; 239/650, 658, 681
See application file for complete search history.

(56) References Cited

U.S. PATENT DOCUMENTS

| | | | |
|---|---|---|---|
| 3,350,017 A * | 10/1967 | Howell et al. ............... | 239/660 |
| 4,056,107 A * | 11/1977 | Todd et al. .................. | 460/112 |
| 4,218,022 A | 8/1980 | Boehm et al. | |
| 4,669,489 A * | 6/1987 | Schraeder et al. .......... | 460/112 |
| 5,232,405 A | 8/1993 | Redekop et al. | |
| 5,482,508 A | 1/1996 | Redekop et al. | |
| 6,251,009 B1 * | 6/2001 | Grywacheski et al. ...... | 460/112 |
| 6,331,142 B1 | 12/2001 | Bischoff et al. | |
| 6,478,674 B2 | 11/2002 | Redekop et al. | |
| 6,656,038 B1 | 12/2003 | Persson | |

(Continued)

FOREIGN PATENT DOCUMENTS

WO    WO/03/071857    9/2003

OTHER PUBLICATIONS

*Rekord brochure—6 pages, no date.

(Continued)

*Primary Examiner*—Árpád Fábián Kovács
(74) *Attorney, Agent, or Firm*—Adrian D. Battison; Michael R. Williams; Ryan W. Dupuis

(57) ABSTRACT

A combine harvester has a straw chopper attached to a rear hood behind the rear edge of the sieve assembly with a chaff guide system to bypass the chaff in front of the chopper and a straw guide system to bypass the straw above the chopper and over the tailboard. The chopper has a housing with a feed opening into which straw and/or chaff can be fed depending upon the positions of the chaff guide system and the straw guide system. A chopping assembly mounted in the housing discharges through a discharge opening through onto the tailboard having a plurality of guide fins for spreading. The housing bottom wall has a pivotal adjustment portion to allow chaff entering the feed opening and engaging the chopping assembly to discharge from the housing at a discharge position different from the discharge opening for spreading with supplementary spreading fins.

11 Claims, 13 Drawing Sheets

U.S. PATENT DOCUMENTS

| | | |
|---|---|---|
| 6,860,805 B2 * | 3/2005 | Kuhn et al. ................. 460/111 |
| 2002/0004417 A1 | 1/2002 | Redekop |
| 2002/0086722 A1 | 7/2002 | Kuhn et al. |
| 2004/0029624 A1 * | 2/2004 | Weichholdt ................. 460/112 |
| 2005/0003876 A1 * | 1/2005 | Kuhn et al. ................. 460/111 |

OTHER PUBLICATIONS

*New Holland brochure—20 pages, date 2003.

* cited by examiner

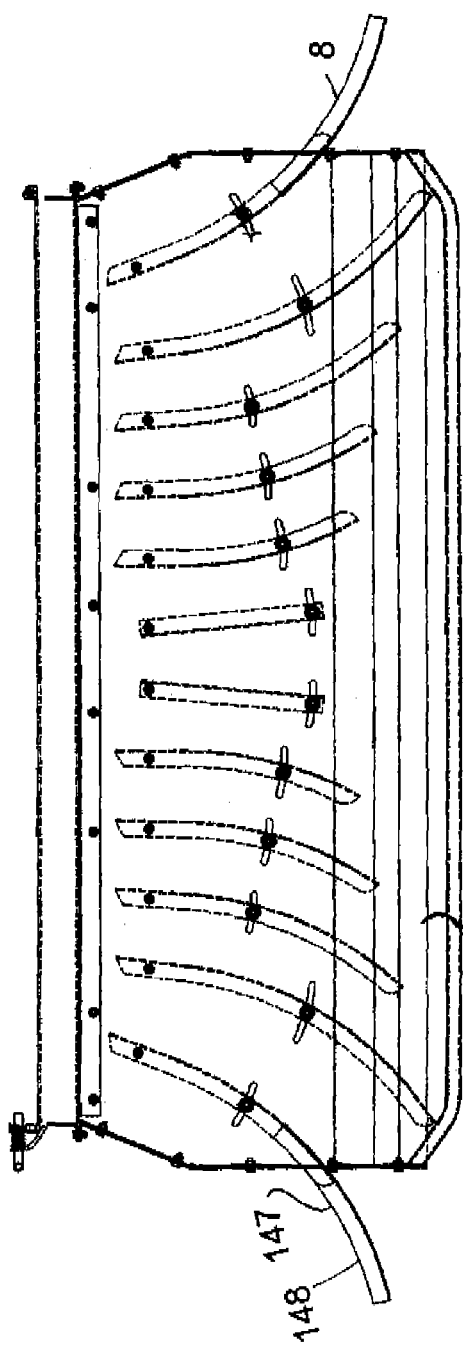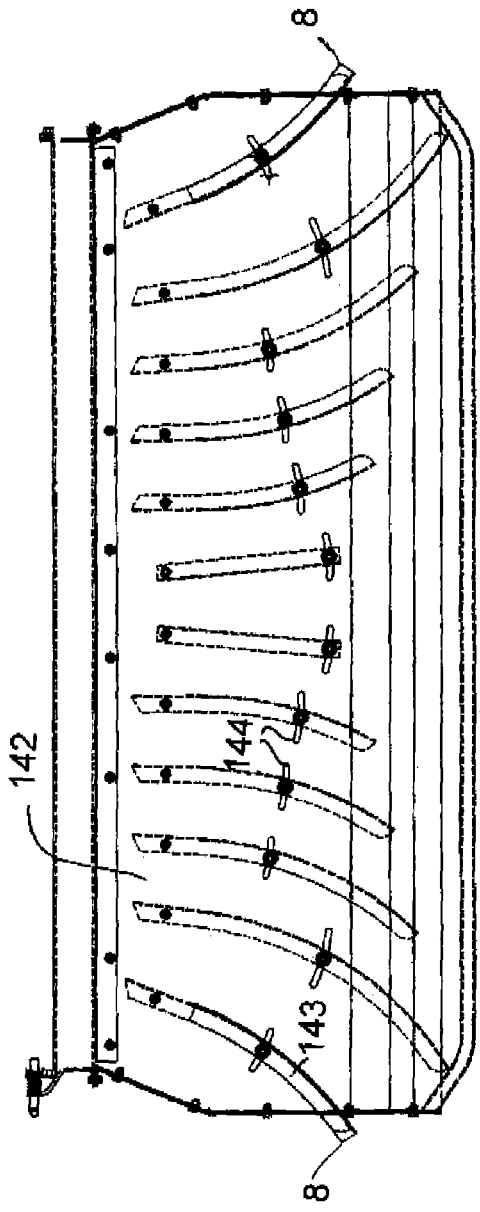

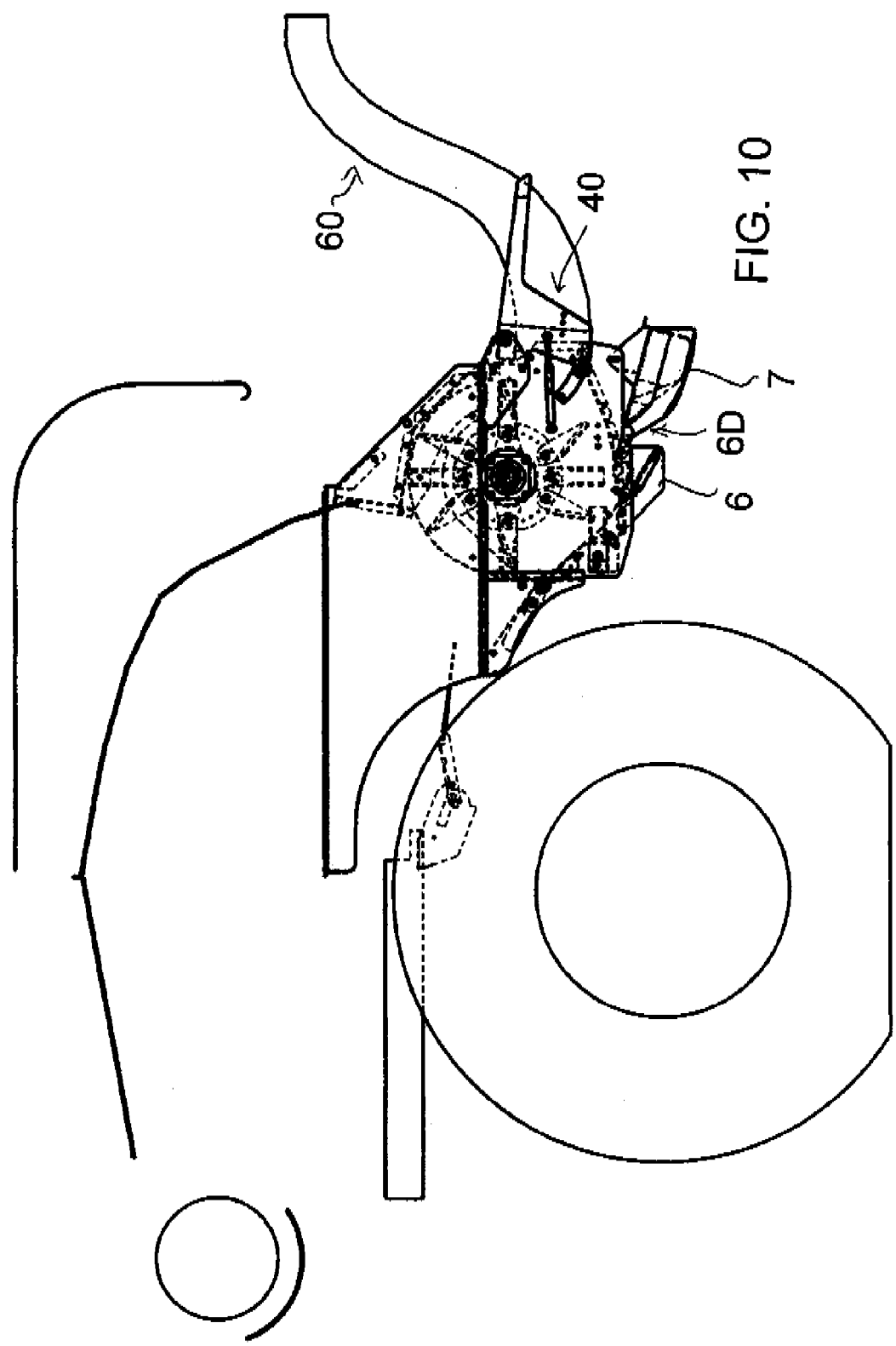

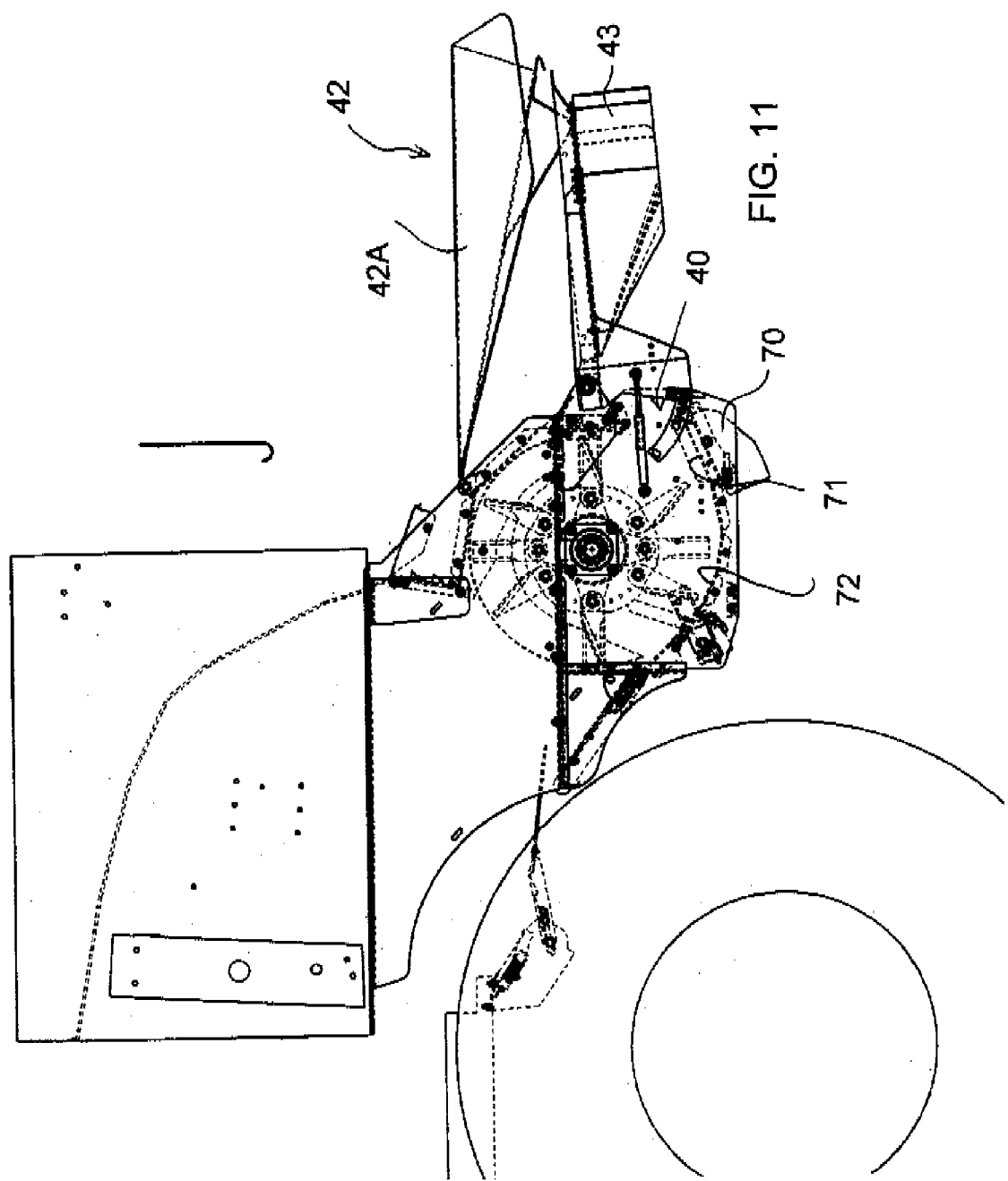

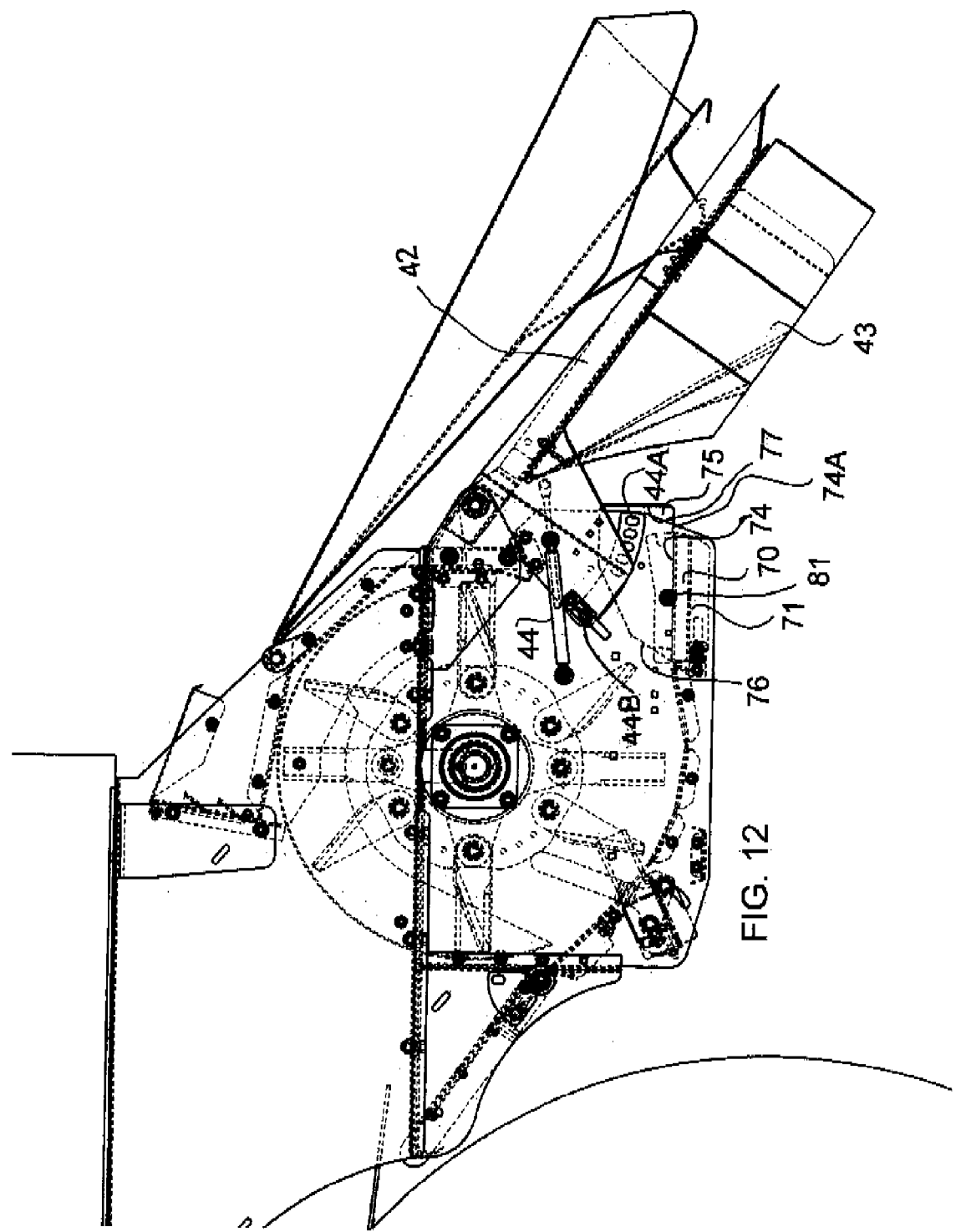

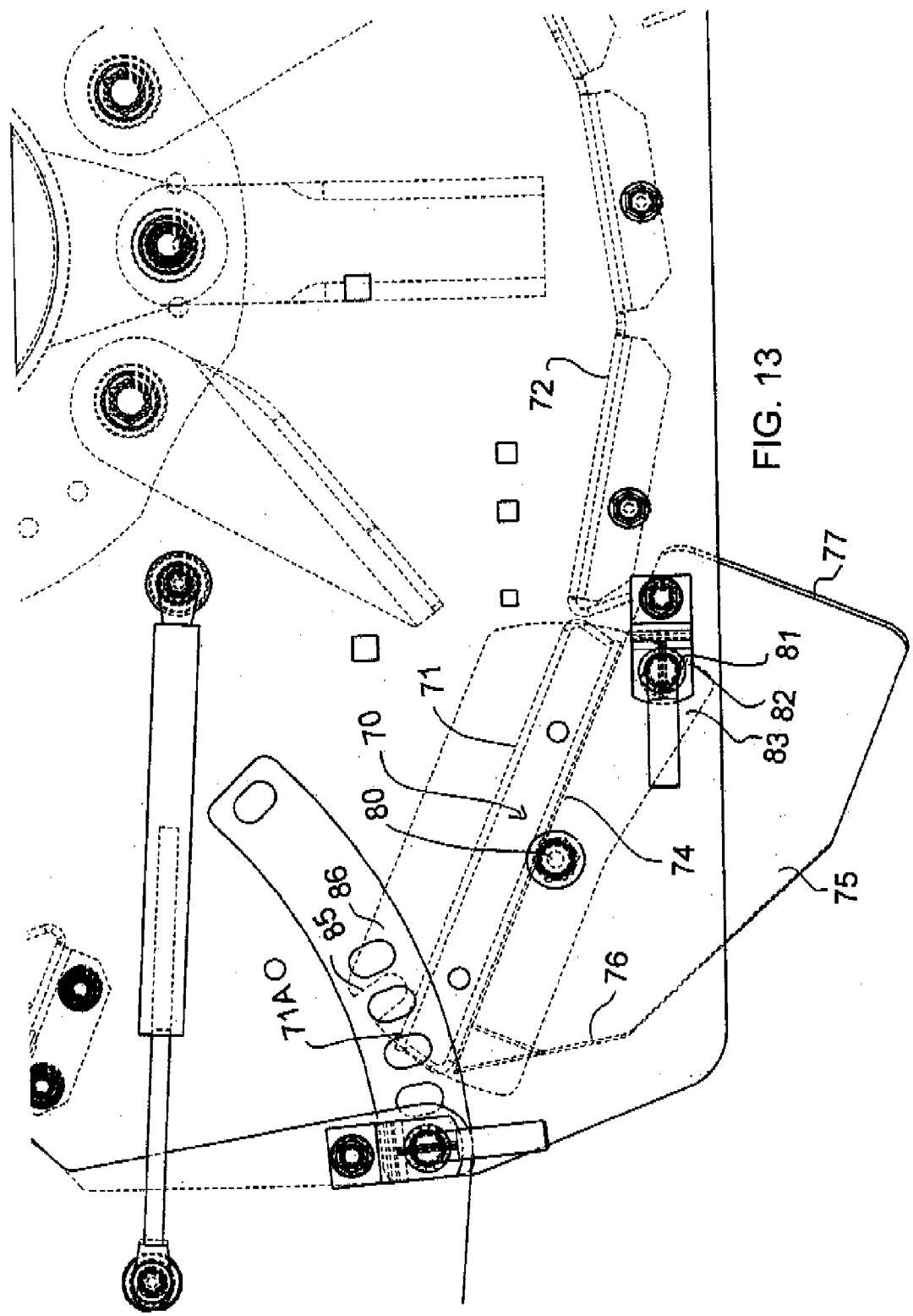

COMBINE HARVESTER WITH READY ADJUSTMENT OF DISCHARGE POSITIONS OF STRAW AND CHAFF

This application is a continuation-in-part of application Ser. No. 11/148,441 filed Jun. 9, 2005 now abandoned.

This invention relates to a combine harvester and a chopper apparatus for a combine harvester, which is readily adjustable to allow the straw and chaff to be spread or windrowed independently as required.

BACKGROUND OF THE INVENTION

Combine development in recent years have put greater demands on the straw choppers and chaff spreaders. The main reasons are that larger combines and wider cutting widths are creating higher flows of straw and chaff; wider cutting widths create more demanding spreading widths; reduced tilling practices have put more demand on even spreading of both straw and chaff and that plant breeding has resulted in tougher straw, higher yields and more residue.

Farmers are demanding straw and chaff spreading systems that will allow them to adjust or operate the combine to select one of the following options, depending upon the requirements at that time:

Spread the straw and chaff evenly over the entire cutting widths of the combine which are now up to 42 feet;

Windrow the straw and chaff together to be bailed at a later date;

Windrow only the straw and spread the chaff; or

Spread the straw and collect the chaff to be used at a later date

Current methods to spread chaff are costly and require additional horsepower and components, that is chaff spinners or fans to boost chaff into chopper.

Some current combines spread chaff through the straw chopper when straw is spread, however when straw is windrowed over the chopper's tailboard the fins are lowered and a wide spread of the chaff is not possible due to the orientation of the fins directing the chaff into the ground Rekord in a publication now WO Patent Application Publication No. 03/071857 describing their Combi system provides an arrangement in which the chaff spinner can be directed to either spread laterally so as to separate from the straw or it can be set to boost the chaff into the straw chopper or the windrowed straw.

Rekord in a publication describing their Rekord Plus system provides an arrangement in which the chaff spinners are mounted under the straw chopper and the output of the spinners utilize the chopper's tailboard for disbursement of the chaff New Holland in a publication describing their CX Combine provides an arrangement in which the chaff is blown into the straw chopper when the straw is windrowed over the tailboard.

U.S. Pat. No. 4,218,022 (VOEHM) issued Aug. 19, 1980 to Gebr. Eicher GmbH discloses a straw chopper and spreader of the type having a rotating rotor with flail blades rotating about a horizontal axis over a floor of the chopper where fins are attached to the floor of the chopper housing at a position adjacent discharge opening. These fins are used in replaced for fins on a tailboard which are now more commonly used.

U.S. Pat. No. 6,331,142 (Bischoff) issued Dec. 18, 2001 to Deer and Company discloses a chopper of the same general type which has a floor panel at the discharge opening which can be adjusted in angle around a pivot axis parallel to the rotor axis and lying in the curvature of the floor so the discharge opening can be moved upwardly and downwardly. This panel is linked by a coupling to a tailboard carrying spreading fins so that an adjustment of one effects adjustment of the other.

US Application 2002/0086722 published Jul. 4, 2002 by Claas discloses an arrangement in which there is provided a straw and chaff chopper and distributor formed by a rotor rotating about a horizontal axis where the chopper includes as part of the structure a tailboard attached thereto. The tailboard can be tilted downwardly and guides inside the harvester activated so that straw is feed over the top of the tailboard for swathing. At the same time the pivotal movement of the tailboard is combined with a pivotal movement of the chopper housing so that the chopper discharges at the required angle to the tail board since the housing is pivoted with the tailboard.

U.S. Pat. No. 6,656,038 (PERSSON) issued Dec. 2, 2003 to Rekordverken discloses a chaff spinner formed by a pair of rotors behind the sieve which can be rotated to position where the chaff is blown into a chopper behind the chaff spinner to be spread with the straw.

SUMMARY OF THE INVENTION

It is one object of the present invention to provide an improved arrangement in a combine harvester which allows a simplified and cost reduced method to spread chaff with a mechanism to utilize the straw chopper to spread the chaff when straw is being dropped It is one object of the present invention to provide an improved arrangement in a combine harvester, which provides a simplified method to switch from full drop to full spread of both straw and chaff.

It is one object of the present invention to provide an improved arrangement in a combine harvester, which provides a simplified method to enhance the fins to spread chaff though the chopper.

It is one object of the present invention to provide an improved arrangement in a combine harvester, which provides alternate straw chopper discharge locations, thereby utilizing a straw chopper for multiple purposes.

According to one aspect of the invention there is provided a combine harvester comprising:

a housing a straw separating system mounted within the housing for separating seed materials from straw for collection of the seed materials and for transport of the straw rearwardly toward a rear of the housing for discharge;

a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;

the housing having a rear hood with a bottom opening in the hood for discharge of the straw and the lighter materials;

a chopper and discharge apparatus mounted at the rear hood and having a feed opening for receiving the straw and chaff from the combine harvester and for discharging the materials rearwardly from the combine harvester;

a chaff guide system movable between a first operating condition guiding the chaff into the feed opening and a second operating condition guiding the chaff to bypass in front of the chopper and discharge apparatus;

a straw guide system movable between a first operating condition guiding the straw into the feed opening and a second operating condition guiding the straw to bypass above the chopper and discharge apparatus;

the chopper and discharge apparatus comprising:

a housing having a feed opening into which straw and/or chaff can be fed from the combine harvester depending upon the positions of the chaff guide door and the straw guide door;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a discharge opening through which the chopped materials are discharged;

a tailboard having a plurality of guide fins;

the tailboard being arranged such that in a first operating condition, the chopped material from the discharge opening is directed onto the guide fins for guiding by the guide fins in a spread pattern;

the tailboard and the straw guide system being arranged such that in the second operating condition, the straw from the combine which has bypassed above the chopper and discharge apparatus passes over the top of the tailboard without contacting the fins for windrowing the straw;

and an adjustment system arranged and operable to allow, with the straw guide system in the second condition thereof and the chaff guide system in the first condition thereof, chaff entering the feed opening and engaging the chopping assembly to discharge from the housing and to be spread after discharge into a spread pattern wider than the chopping assembly.

In one embodiment, the adjustment system comprises a portion of the housing which is adjustable to cause the chaff carried by the chopping assembly to escape from the housing at a discharge position different from the discharge opening for spreading.

In this arrangement, the housing preferably has a bottom wall over which the chopped material passes to the discharge opening and wherein the adjustment system comprises a portion bottom wall which is movable.

In this arrangement, the bottom wall preferably has a pivotal portion which can pivot downwardly to provide said adjustment portion.

In this arrangement, there is preferably provided a chaff spreading device arranged such that the chaff discharging from the different position engages onto the chaff spreading device for spreading.

Preferably the chaff spreading device comprises a second set of fins, however those skilled in the art will recognize that any spreading device could be utilized—powered spinners mounted with a horizontal or vertical rotational axis, air jets etc.

Preferably the chaff spreading device comprises a chaff board which is attached to the housing below the discharge opening of the housing.

Preferably the chaff board is pivotally attached to the housing.

Preferably the bottom wall comprises a part cylindrical wall partly surrounding the axis of rotation of the chopping assembly and extending from the inlet to the discharge outlet and wherein a portion of the bottom wall is pivotal about an axis across the bottom wall so that a trailing edge of the portion defines said different discharge position leaving a fixed part of the bottom wall between the different discharge position and the discharge opening.

As an alternative arrangement where, in the second operating condition, the tailboard is inclined downwardly so that straw from the combine passes over the top of the inclined tailboard without contacting the fins for windrowing the straw, the adjustment system comprises adjustable fins of the tailboard which are adjustable to an adjusted position such that chaff exiting from the discharge opening impacts on the downwardly inclined tailboard and on the fins in the adjusted position thereof and is spread by the fins.

In this arrangement, the fins are preferably adjustable by extending at least some of the fins along their length so as to increase their length on the same curvature.

According to a second aspect of the invention there is provided a chopper and discharge apparatus arranged to be mounted at the rear hood of a combine harvester for receiving the straw and chaff from the combine harvester and for discharging the materials rearwardly from the combine harvester, the apparatus comprising:

a housing having a feed opening into which straw and/or chaff can be fed from the combine harvester;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a discharge opening through which the chopped materials are discharged;

a tailboard mounted on the housing and having a plurality of guide fins;

the tailboard being arranged such that in a first operating condition, the chopped material from the discharge opening is directed onto the guide fins for guiding by the guide fins in a spread pattern;

the tailboard being arranged such that in the second operating condition, the straw from the combine which has bypassed above the chopper and discharge apparatus passes over the top of the tailboard without contacting the fins for windrowing the straw;

and the housing having an adjustment portion to allow chaff entering the feed opening and engaging the chopping assembly to discharge from the housing at a discharge position different from the discharge opening for spreading.

According to a third aspect of the invention there is provided a chopper and discharge apparatus arranged to be mounted at the rear hood of a combine harvester for receiving the straw and chaff from the combine harvester and for discharging the materials rearwardly from the combine harvester, the apparatus comprising:

a housing having a feed opening into which straw and/or chaff can be fed from the combine harvester;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a discharge opening through which the chopped materials are discharged;

a tailboard mounted on the housing and having a plurality of guide fins;

the tailboard having a first operating position in which the chopped material from the discharge opening is directed onto the guide fins for guiding by the guide fins in a spread pattern;

the tailboard having a second operating position in which the tailboard is inclined downwardly to allow straw from the combine which has bypassed the feed opening to pass over the tailboard without contacting the fins for windrowing the straw;

wherein the guide fins of the tailboard are adjustable when the tailboard is in the second operating position for spreading chaff;

wherein the adjustment increases the spread width of the chaff; and wherein the adjustment changes selected fins from a substantially downward trajectory to a substantially lateral trajectory.

According to a fourth aspect of the invention there is provided a chopper and discharge apparatus arranged to be mounted at the rear hood of a combine harvester for receiving the straw and chaff from the combine harvester and for discharging the materials rearwardly from the combine harvester, the apparatus comprising:

a housing having a feed opening into which straw and/or chaff can be fed from the combine harvester;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a discharge opening through which the chopped materials are discharged;

a wagon discharge tube mounted to the chopper discharge opening to discharge the chaff and/or straw to a trailing collection wagon;

a tailboard mounted on the housing and having a plurality of guide fins;

the housing having an adjustment portion to allow the chopped materials to discharge from the housing at a second discharge position different from the discharge opening for collecting;

the wagon discharge tube being arranged such that in a first operating condition, the chopped material from the discharge opening is directed from the discharge opening onto the wagon discharge tube for collection of the chopped material;

the tailboard being arranged such that in the second operating condition with the chopped material discharged from the second discharge opening, the residue from the combine is directed onto the guide fins for guiding by the guide fins in a spread pattern.

According to a fifth aspect of the invention there is provided a combine harvester comprising:

a housing a straw separating system mounted within the housing for separating seed materials from straw for collection of the seed materials and for transport of the straw rearwardly toward a rear of the housing for discharge;

a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;

the housing having a rear hood behind the rear edge of the sieve assembly with a bottom opening in the hood for discharge of the straw and the lighter materials;

a chopper and discharge apparatus mounted at the rear hood and having a feed opening for receiving the straw and chaff from the combine harvester and for discharging the materials from the combine harvester;

a chaff guide system operable for guiding the chaff into the feed opening;

a straw guide system movable between a first operating condition guiding the straw into the feed opening and a second operating condition guiding the straw to bypass above the chopper and discharge apparatus;

the chopper and discharge apparatus comprising:

a housing having a feed opening into which straw and/or chaff can be fed from the combine harvester depending upon the positions of the chaff guide system and the straw guide system;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a guide surface and a rear discharge member defining a discharge opening through which the chopped materials are discharged;

a tailboard having a plurality of guide fins;

the tailboard being arranged such that in a first operating condition, the chopped material from the discharge opening is directed onto the guide fins for guiding by the guide fins in a spread pattern;

the tailboard and the straw guide system being arranged such that in the second operating condition the tail board is inclined downwardly to cause the straw from the combine which has bypassed above the chopper and discharge apparatus passes over the top of the inclined tailboard without contacting the fins for windrowing the straw;

and the rear discharge member being arranged and operable to cause a guide surface thereof and a trailing edge thereof to be moved downwardly from a first upper position for discharging straw onto the tailboard to a second position such that, with the straw guide system in the second condition thereof and the chaff guide system in the first condition thereof, chaff entering the feed opening and engaging the chopping assembly is discharged from the housing in the second position at a lower position than the straw is discharged in the first position so as to impact on the inclined tailboard and to be spread after discharge into a spread pattern wider than the chopping assembly.

According to a sixth aspect of the invention there is provided a combine harvester comprising:

a housing a straw separating system mounted within the housing for separating seed materials from straw for collection of the seed materials and for transport of the straw rearwardly toward a rear of the housing for discharge;

a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;

the housing having a rear hood behind the rear edge of the sieve assembly with a bottom opening in the hood for discharge of the straw and the lighter materials;

a chopper and discharge apparatus mounted at the rear hood and having a feed opening for receiving the straw and chaff from the combine harvester and for discharging the materials from the combine harvester;

a chaff guide system operable for guiding the chaff into the feed opening;

a straw guide system movable between a first operating condition guiding the straw into the feed opening and a second operating condition guiding the straw to bypass above the chopper and discharge apparatus;

the chopper and discharge apparatus comprising:

a housing having a feed opening into which straw and/or chaff can be fed from the combine harvester depending upon the positions of the chaff guide system and the straw guide system;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a guide surface and a rear discharge member defining a discharge opening through which the chopped materials are discharged;

a tailboard having a plurality of guide fins;

and the rear discharge member being arranged and operable to be adjusted between first and second operating conditions wherein a plurality of chaff spreading fins are located on the guide surface of the rear discharge member when in the second condition and removed when in the first condition.

BRIEF DESCRIPTION OF THE DRAWINGS

One embodiment of the invention will now be described in conjunction with the accompanying drawings in which:

FIGS. 8 and 9 are bottom plan views of the tailboard only showing adjustment of the fins of the tailboard for spreading the chaff when the straw is swathed and the chaff spread.

FIG. 10 is a side elevational view of a rear section of a combine harvester and a straw chopper with two discharge locations; one to a delivery tube discharging into a towed wagon and a second discharge to a tailboard for spreading.

FIG. 11 is a side elevational view of a further embodiment according to present invention in a position in which straw and chaff are both feed to the rotor and are discharged from the rotor together from the rear discharge opening onto the spread fins of the tailboard for combined spreading.

FIG. 12 is a side elevational view of the embodiment of FIG. 11 in which the tailboard is tilted downwardly for discharge of the straw over the tailboard by passing the rotor and the housing of the housing of the rotor is modified for spreading of chaff separately from the straw.

FIG. 13 is side elevational view on an enlarged scale showing the embodiment of FIGS. 11 and 12 in the position of FIG. 11 and showing particularly the adjustable discharge member.

DETAILED DESCRIPTION

Figure 1:
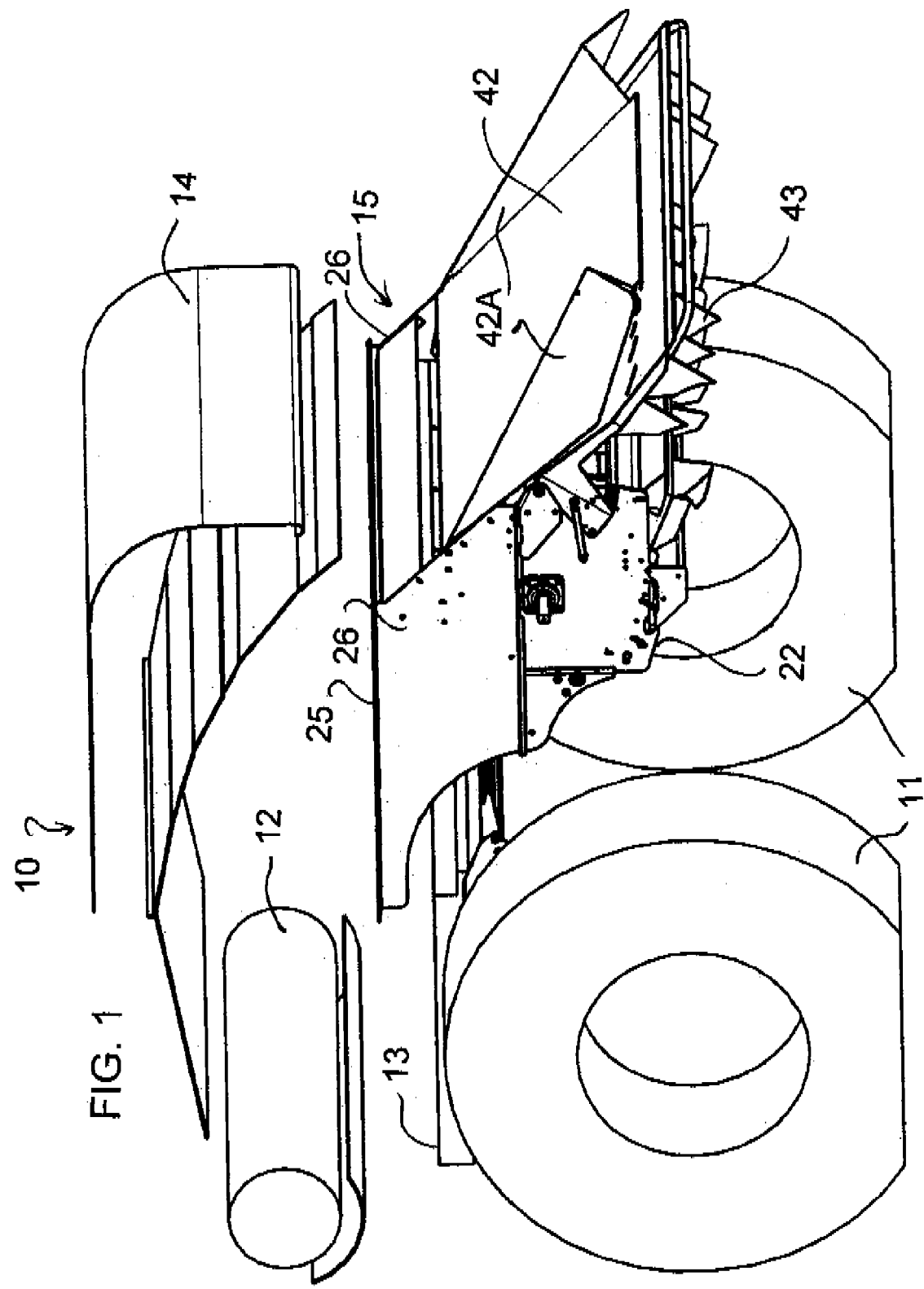
FIG. 1 is a schematic isometric view of a rear section of a combine harvester and straw chopper according to the present invention.
Figure 2:
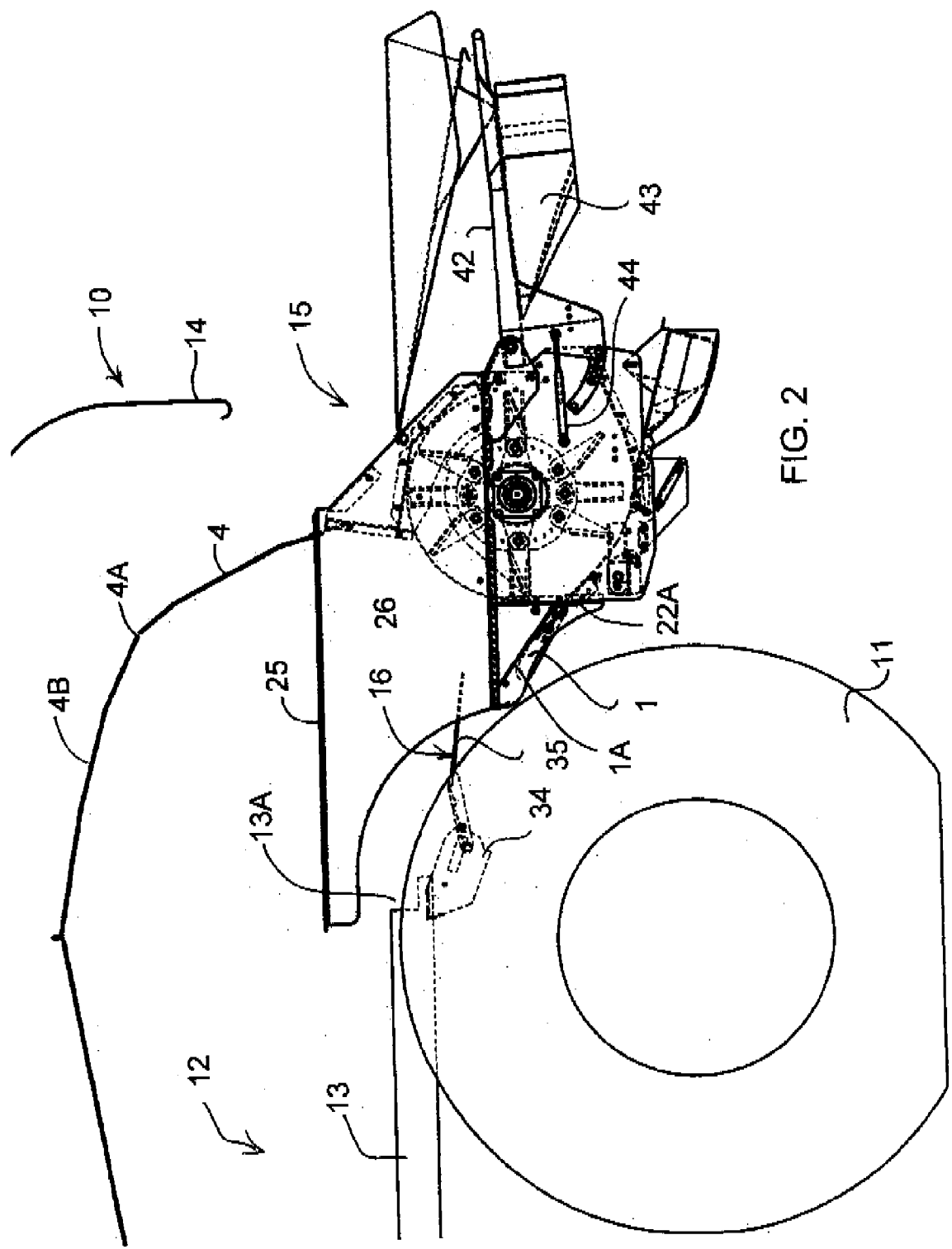
FIG. 2 is a schematic side elevational view of the combine harvester and straw chopper of FIG. 1 showing the chopper arranged for chopping the straw and spreading the straw and chaff in a conventional manner.
Figure 5:
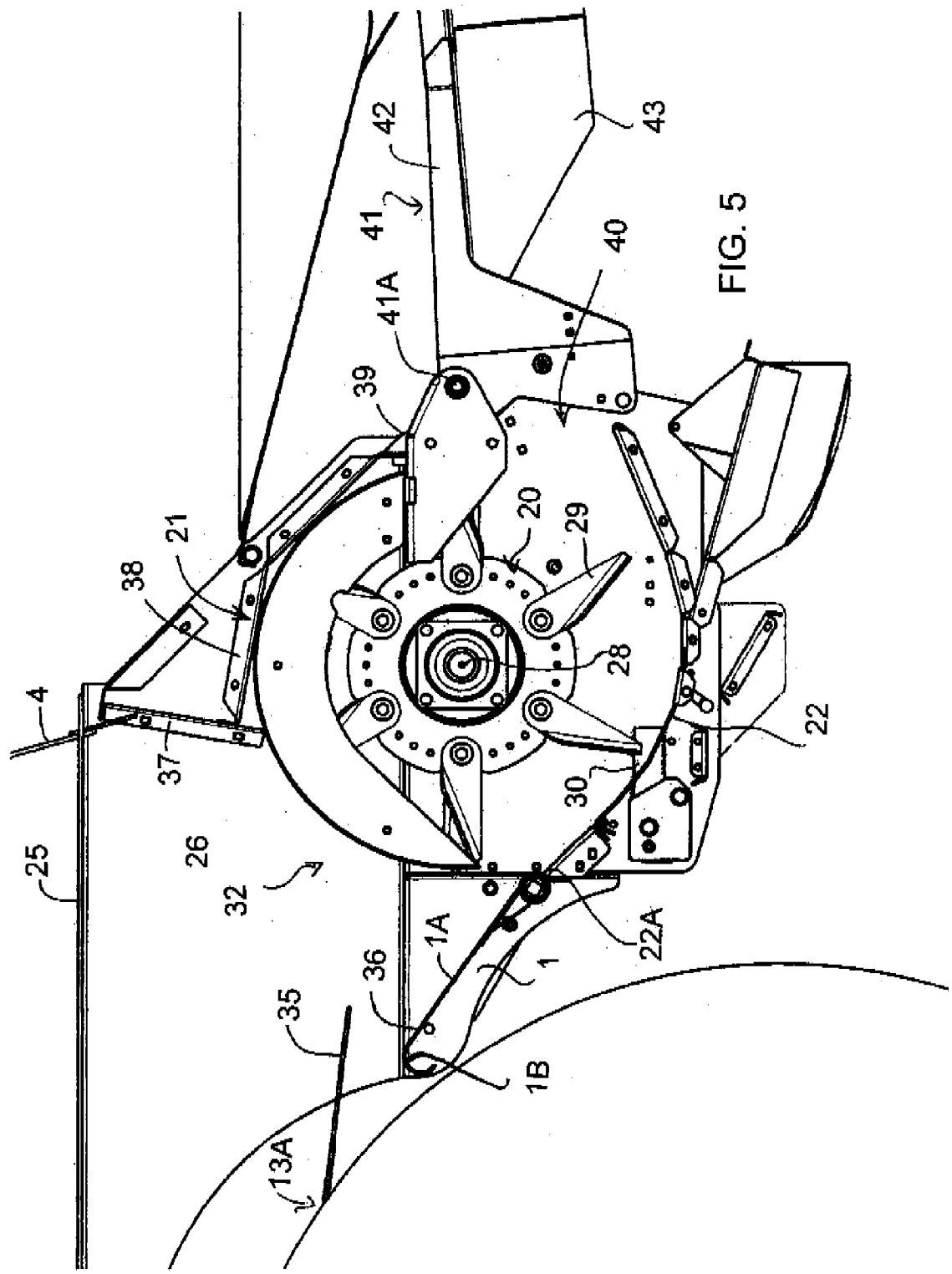
FIG. 5 is a side elevational view of the chopper of FIG. 2 on an enlarged scale showing the openable portion of the bottom wall in more detail and in the closed position of FIG. 2.

A combine harvester shown in FIGS. 1, 2 and 5 comprises a combine harvester housing 10 mounted on ground wheels 11 for transport over a ground in conventional manner. The combine harvester is shown only schematically since many different designs are available and well known to one skilled in the art. The combine harvester includes a straw separation section generally indicated at 12 and a sieve section generally indicated at 13. Again these elements are conventional and provide arrangements for separation of the straw from the crop material allowing the seed material to fall through to the sieve at which seeds are separated from the seed material leaving the chaff or other lighter materials on top of the sieve to be carried away from the sieve by an air flow through the sieve as is well known.

The rear of the combine is provided is a rear hood 14 into which air from the straw separation system and the sieves enters and into which straw is discharged rearwardly for falling vertically downwardly in the hood section 14 into a chopper and spreader generally indicated at 15.

This arrangement is well known and commercial products are readily available from Redekop Manufacturing and other manufacturers of straw choppers of this type.

The chaff from the rear end of the sieve as best shown in FIG. 2 at 13A is carried by a pan 16 into the chopper 15.

An example of a chopper of this type is disclosed in U.S. Pat. No. 6,478,674 issued Nov. 12, 2002, U.S. Pat. No. 5,482,508 issued Jan. 9, 1996 and U.S. Pat. No. 5,232,405 issued Aug. 3, 1993 all of Leo Redekop, and US applications 2002/0004417 published Jan. 10, 2002 and 2004/0043804 published Mar. 4, 2004, the disclosures of which are incorporated herein by reference.

The chopper typically has a horizontal upper mounting flange 25 which attaches to a corresponding bottom flange of the hood of the combine. This forms a rectangular open mouth at the top of the chopper which corresponds in shape to the rectangular lower opening of the hood so that all material discharging from the hood falls into the upper part of the housing and enters the chopper.

The chopper comprises a housing attached to the top mounting flange and depending therefrom and defined by side walls 26 at opposite sides of the hood and generally co-planar therewith. Bridging the side walls 26 is provided a bottom wall 22 and a top wall 21 which extend across the width of the chopper and form a generally cylindrical area for receiving the chopper rotor 20. The rotor 20 includes a hub 28 with a plurality of radially extending flails or blades 29 carried on the rotor for rotation therewith around the axis of the rotor which is arranged across the width of the chopper.

Many different arrangements and construction of blade can be used as are well known to one skilled in the art and described in the above patents of Redekop. In most cases the chopper includes stationary blades 30 mounted on the bottom wall 22 at a position partway around the bottom wall. The stationary blades are arranged in a row at spaced positions across the width of the chopper so as to co-operate with the rotating blades of the hub in a chopping action. The spacing between the blades can be selected in accordance with the type of rotating blades as is well known to one skilled in the art.

The top wall 21 and the bottom wall 22 define at the upper part of the housing an inlet 32 into which the materials can fall from the hood and from the sieve 13A. The chaff guide plate 16 includes a mounting 34 and a plate 35 which extends so that the materials falling from the end of the sieve extend over the space between the end of the sieve and the front edge 22A of the bottom wall 22 so as to carry the chaff in the air stream from the sieve over the plate and into the opening 32.

In most cases the top wall 21 includes a generally vertical portion 37 which extends downwardly from the top flange 25 to the top of the rotor. The top wall 21 further includes a curved section 38 which extends around the top of the rotor to a rear edge 39 which defines the top edge of the rear discharge opening 40 through which the material exits in the stream of air and chopped materials generated by the rotation of the rotor within the housing.

A tailboard 41 is pivotally mounted on the rear part of the housing at a pivot mount 41A. The tailboard comprises a base plate 42 with a series of fins 43 on the underside shaped and arranged so that material exiting from the discharge opening 40 is thrown up against the underside of the tailboard and impacts the fins causing a change in direction of the material on the tailboard so as to spread the material using the momentum generated in the stream from the rotor. The angle of the tailboard can be adjusted around the pivot 41 by actuating a pin. A cylinder 44 is utilized to minimize the effort required to lift the tailboard. On the upper side of the tailboard is provided a pair of guides 42A which define inwardly converging side edges of the tailboard to form in effect a chute for the straw passing over the upper side of the tailboard during the by-pass action described herein. Thus the straw converges inwardly and forms a narrower swath as it is discharged over the tailboard.

The flow of straw and chaff to the chopper is controlled by a straw door 4 pivotal at an upper end 4A at the rear of the hood and the chaff door 1 located between the rear end of the sieve and the front edge of the bottom wall of the chopper. Thus the door 4 is pivoted at its upper edge 4A and forms a panel extending across the rear part of the hood for engaging and guiding the straw. The door forms an extension of a straw guide surface 4B which curves downwardly and rearwardly so that the straw flowing over the surface can be guided downwardly into the opening 32. The door can be pivoted from a downward direction shown in FIG. 2 which guides the straw into the chopper to a raised position shown in FIGS. 1 and 3 which allows the straw to flow across the upper part of the hood along the direction generated by the wall 4B over the chopper opening 32 thus by-passing the chopper. The door can also me pivoted about its front edge 4A to a forward position shown in FIG. 4 in which it is inclined forwardly and downwardly so as to by-pass the opening 32.

The guide plate 35 is pivoted at its front edge so as to be movable from a first position extending from its front pivot edge across the open space in front of the sieve to bridge that space and act to carry the material from the sieve to the chopper inlet opening 32 to a second position in which it extends downwardly allowing the chaff to by-pass the inlet opening 32. In addition the chopper inlet includes an inlet door 1 which is movable as shown by comparing FIG. 2 and FIG. 4. In a feed position shown in FIG. 2 it defines an inclined upper surface 1A from a lead edge 1B at the rear end of the plate 35 descending into the opening 32 at the edge 22A. In a blocking position shown in FIG. 4 the door is raised so as to form an obstacle to material entering the opening 32 so that the lead edge 1B is raised up vertically above the front edge 22A of the opening 32.

In addition to the above doors, a further adjustment arrangement is provided which is a portion 6 of the bottom wall of the chopper housing. This portion 6 forms an arcuate section which in the closed position shown in FIG. 5 continues to carry the material around the arc of the chopper blades of the rotor to cause the material to flow around the housing with the rotor. The portion is pivotal about a leading edge 6A which lies in the cylindrical surface of the housing and extends parallel to the axis of the rotor. Thus when opened by sliding side mounting pins 6C in slots 6B in the side walls 26, the portion drops downwardly allowing the material carried by the rotor to escape centrifugally from the confines of the housing at an opening 6D at the trailing edge of the portion 6 angularly in advance of the normal discharge exit 40. Behind the trailing edge 6D of the portion 6 is provided a supplementary set of guide fins 7 which are carried on a chaff board 7A mounted underneath the normal discharge opening on a mounting 7C which is attached to the housing 15 by a mounting pin 7E at the front end and lugs 7F at the rear end. Thus the materials thrown from the trailing edge 6E by the momentum created by the rotor are thrown onto the guide fins of the chaff board which are shaped and arranged in conventional manner to define a spread pattern independently of the main guide fins 43 on the tailboard 42. The fins 7 are arranged at spaced positions across the bottom wall of the housing. The fins are generally used independently of the tailboard fins so that even when moved to the lowered position shown in FIG. 3, the chaff is directed by the fins 7 and by-passes the fins 43 on the tailboard 42.

The arrangement disclosed herein eliminates the need for a separate chaff spreader by utilizing the straw chopper to do the work when either spreading or windrowing the straw. The following description describes how the invention is adjusted to address the above demands:

Scenario 1: chaff is collected when the chaff door 1 is moved to the inclined open position and the guide plate 35 is raised to guide the chaff to the chopper assembly. The straw door is moved to the feed position. These positions are shown in FIG. 2. The chaff is spread with the straw by the means of the straw chopper's rotating fan blades. Chaff is entrained in the straw mat and spread further and more even than can typically be done with a chaff spreader alone Scenario 2: the chaff inlet door 1 to the chopper assembly is closed and the plate 35 is lowered while the door 4 is moved to the forward most blocking position with these positions being shown in FIG. 4 and both straw and chaff are prevented from entering the inlet to the chopper and thus are windrowed in front of the chopper.

Figure 3:
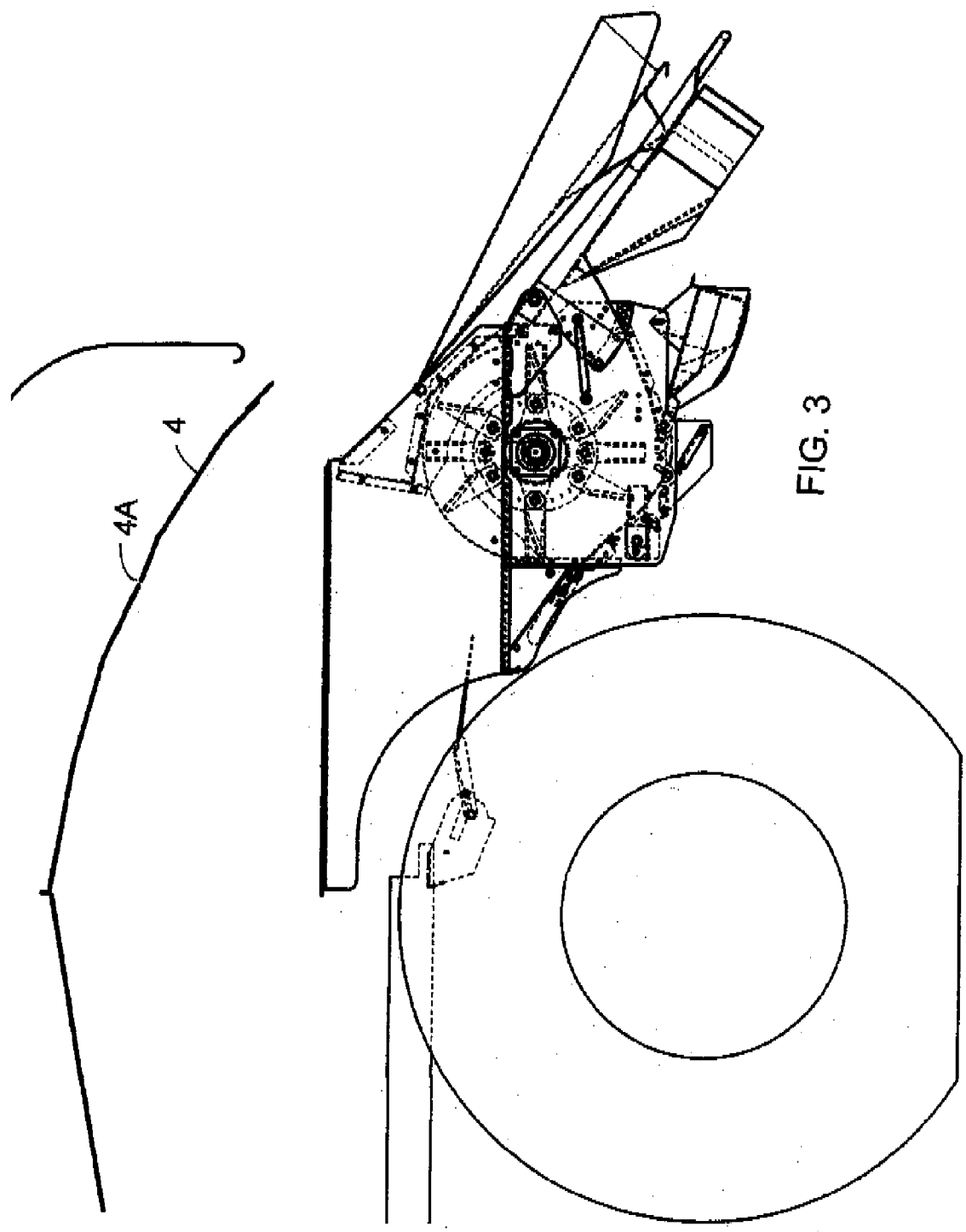
FIG. 3 is a schematic side elevational view of the combine harvester and straw chopper of FIG. 1 showing the chopper arranged for swathing the straw and spreading the chaff in a manner according to the present invention.
Figure 4:
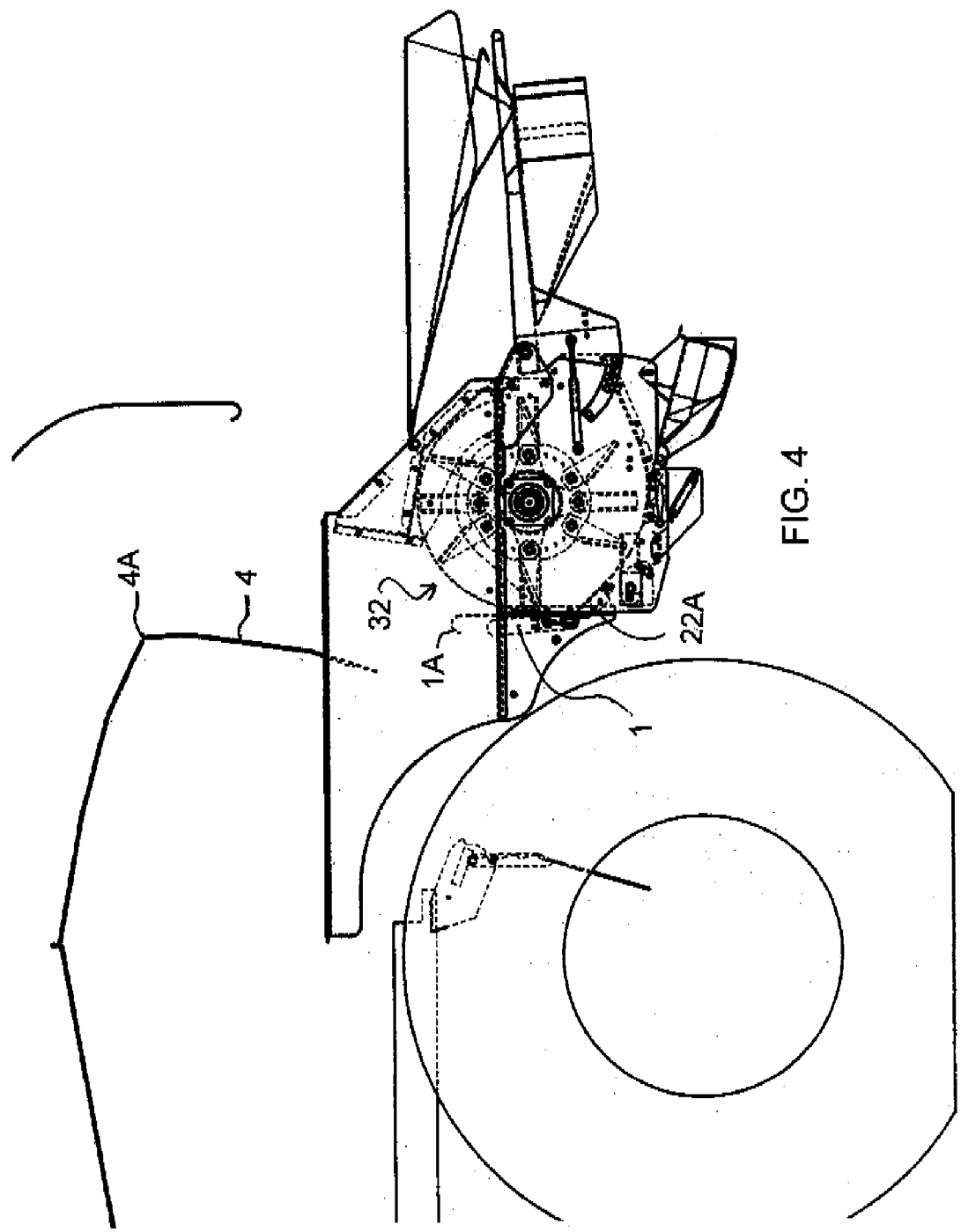
FIG. 4 is a schematic side elevational view of the combine harvester and straw chopper of FIG. 1 showing the chopper arranged for swathing the straw and chaff by-passing the chopper.

Scenario 3: the straw door 4 is opened to the by-pass position shown in FIG. 3 to allow straw to be windrowed and exit behind the chopper. The tailboard is dropped to allow the rear exiting straw to smoothly flow off of the tailboard. The chaff door 1 is moved to the opened position and the portion 6 of the chopper floor is opened to allow an exit for or all residue from the sieves. The chopper generates the air pressure to accelerate and spread the chaff. The directional fins 7 on the chaff board 7A are employed to spread the chaff exiting the chopper. The directional fins 7 are not compromised by the adjustment of chopper's tailboard 42. Optionally the chaff could be dropped in front of the chopper and the straw behind, however this is typically not desirable since the chaff would form a thick bed below the swathed straw.

Scenario 4 an optional chaff blower is utilized to fill a trailing wagon.

In FIGS. 8 and 9 is shown an alternative arrangement of the tailboard indicated at 142 and showing the fins previously described at 143. As is well known, such fins can be adjusted side to side by pivoting each fin about its leading edge with the guide and locking operation of the fin being obtained by a pin sliding in a slot 144 in the tailboard.

For an enhanced effect of the tailboard fins, for acting on the chaff when the straw is by-passed over the top of the tailboard, the outermost fins can be adjusted as shown in FIG. 8 as indicated at 148 by sliding an extension portion 147 the fin along its length while maintaining the same fin curvature. Preferably this adjustment is effected on both the outermost and the penultimate fins only as similar adjustment of the other fins has little effect. This easily adjustable fin extension can be provided that is slid out from the backside of the downward projecting fins when the tailboard is lowered. This changes the trajectory of the fins and allows a wider spread of the chaff. This is the most cost effective and energy efficient method to accomplish scenarios 1 and 3 above. For example—the New Holland CX combine utilizes two hydraulic driven fans to blow the chaff from the back of the sieves to the chopper. When the straw is being swathed, the tailboard is oriented substantially downwards and blasts the chaff directly into the ground.

This system of fin adjustment is primarily used in place of the chaff board 7A and the opening portion 6 since it can act on the chaff exiting the normal chaff opening and impacting on the normal fins with the exception that the tailboard is in its downwardly inclined position for straw swathing and the fine are adjusted as set forth above to act on the chaff.

In addition, where the opening 6 and the chaff board 7 are used, in the case that the chaff exit 6 is overloaded any material that by pass the first exit 6 flows to the tailboard 142 and the main fins 143 and despite the downward inclination of the tailboard is further spread by the fins to provide an enhanced spread pattern.

Figure 6:
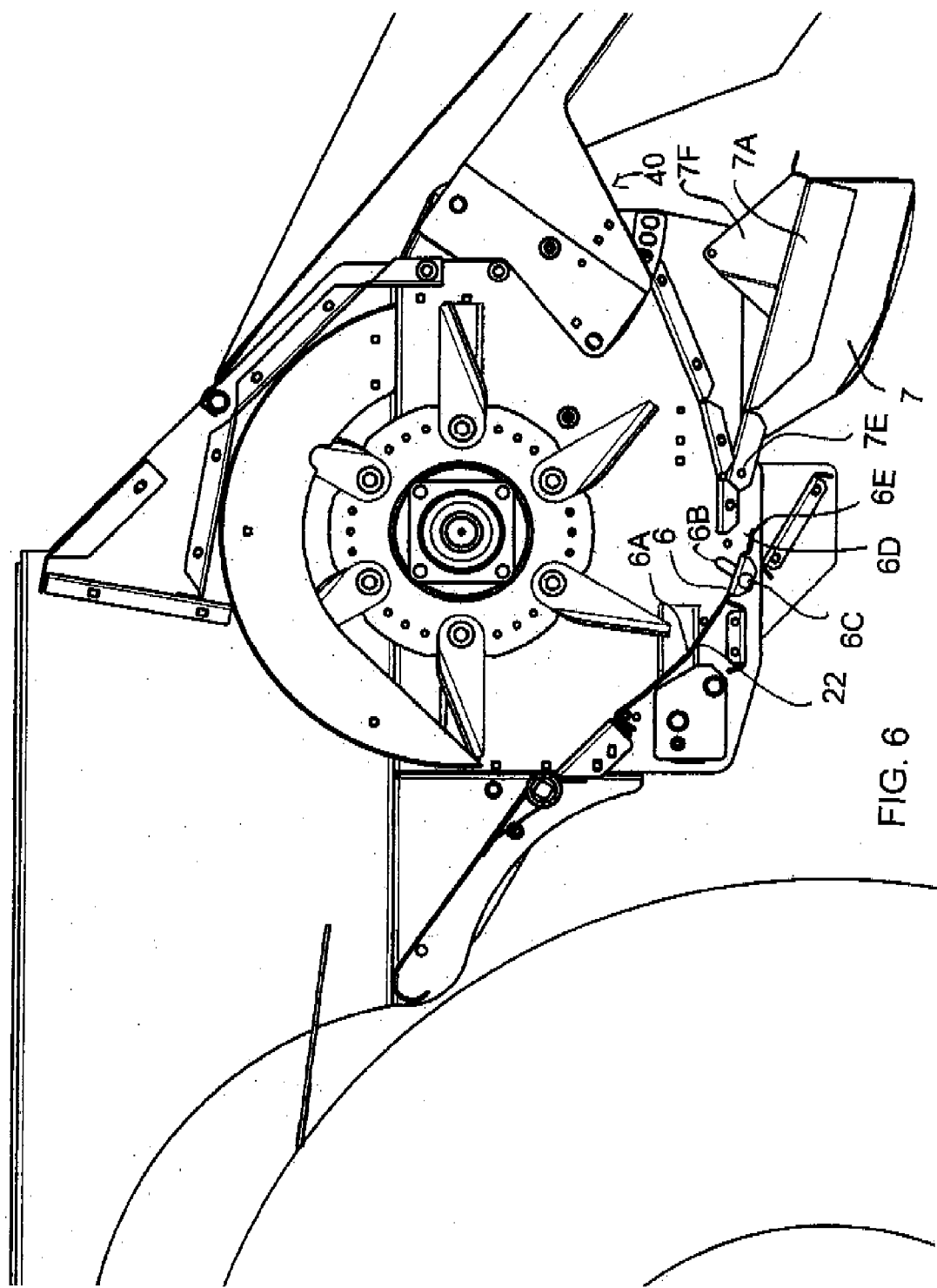
FIG. 6 is a side elevational view of the chopper of FIG. 2 on an enlarged scale showing the openable portion of the bottom wall in more detail and in the open position of FIG. 3.
Figure 7:
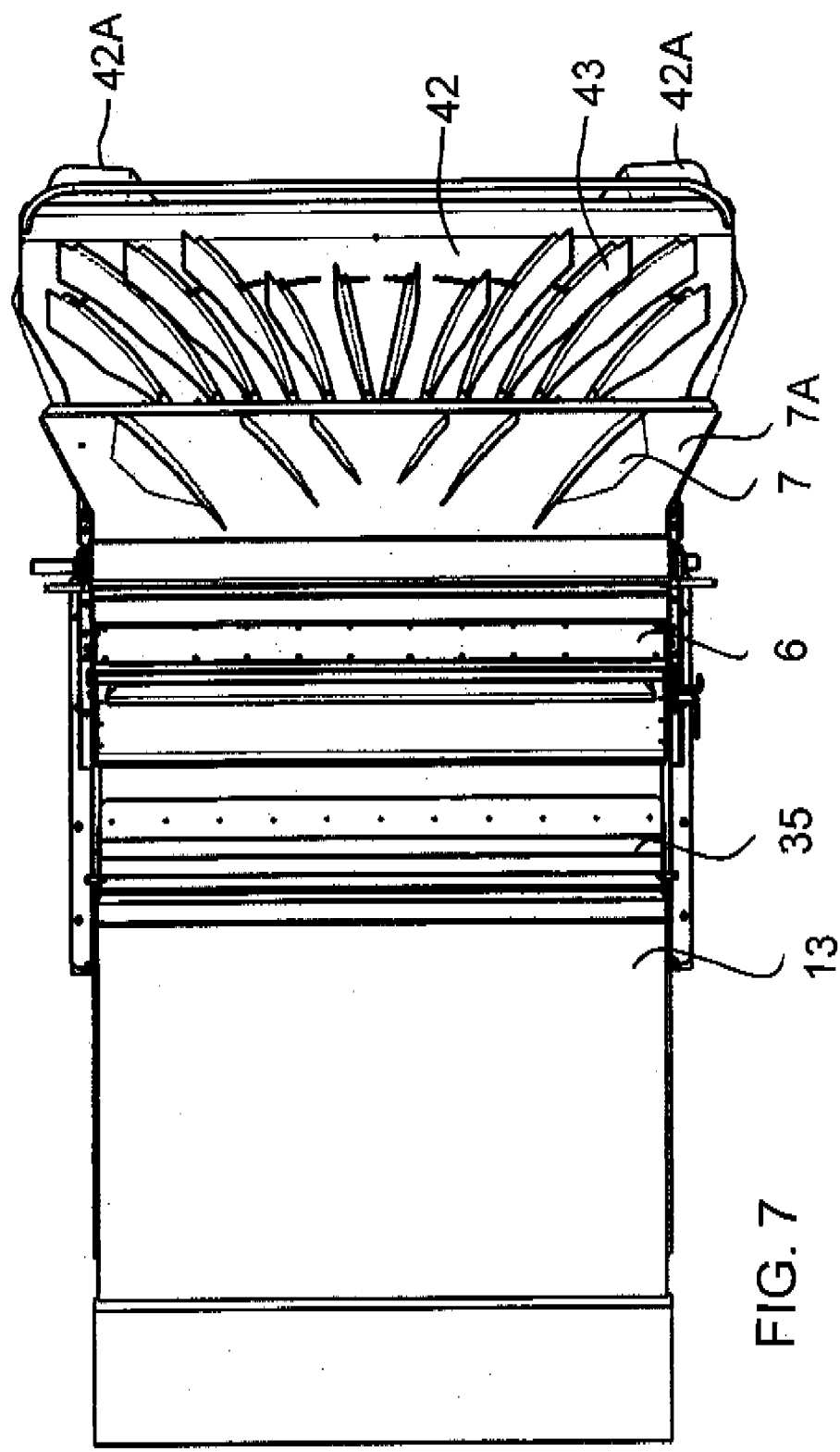
FIG. 7 is a bottom plan view of the chopper and the tailboard in the position of FIG. 3.

FIG. 10 is a side elevational view utilizing the chopper housing as best shown and described in FIG. 6 including the pivotal bottom wall portion 6 and the chaff board 7. This provides the second discharge opening 6D which is separated from the main discharge opening 40 and which becomes active when the pivot portion 6 o the wall is opened.

In this arrangement the tail board is replaced by a wagon discharge tube 60 of a conventional construction. This is arranged to receive all of the material from the discharge opening 40 and to transport that material upwardly and rearwardly for collection in a conventional straw collection trailer trailed behind the combine harvester. Devices of this type are well known and readily available to one skilled in the art.

In this arrangement, therefore, the operator can select that the housing is operated and arranged so that the chopped material is discharged at the opening 40, transported by the wagon discharge tube to the collection trailer (or any other collection system). Alternatively the housing can be arranged by operating the pivotal opening section 6 so that the material is discharged onto the fins of the chaff board 7A for spreading.

Thus in general the housing includes the ability to select one or other of two discharge openings so that they can be used independently to provide a particular effect on the material carried in the chopping assembly. It will be appreciated that the two discharge openings can be used in different ways depending upon requirements and the operator can open the second discharge opening if required or can close the second discharge opening and maintain the situation where the chopped material is discharged at the main discharge opening. Yet further it will be appreciated that further discharge openings can be provided if desirable so that the operator can select one or other of a plurality of such discharge openings by utilizing additional elements of the type shown at 6.

In FIGS. 11 and 12 is shown a further modified embodiment having the general components previously described including the tailboard 42 having the fins 43 and the guides 42A. The chopper is substantially as previously described except that the opening section 6 and the supplementary chaff board 7A are omitted. In place of this arrangement is provided a adjustable discharge member generally indicated at 70. In the position shown in FIG. 11 the adjustable discharge member 70 is arranged so it have a smooth upper surface 71 which follows the curvature of the wall 72 of the housing. The upper surface contains no fins and provides thus merely a smooth surface over which straw can pass freely around the curved bottom wall of the housing for discharge through the discharge opening 40 onto the fins 43 of the tailboard 42. The construction and design of this arrangement in this position is substantially in accordance with the previous arrangements. The flails of the rotor can be of the type described in US Application 2004/0043804 mentioned previously herein.

In this position straw and chaff discharged through the open mouth of the inlet of the chopper is carried by the chopper rotor in conventional manner through the chopping action and through the discharge action in conventional manner.

Figure 14:
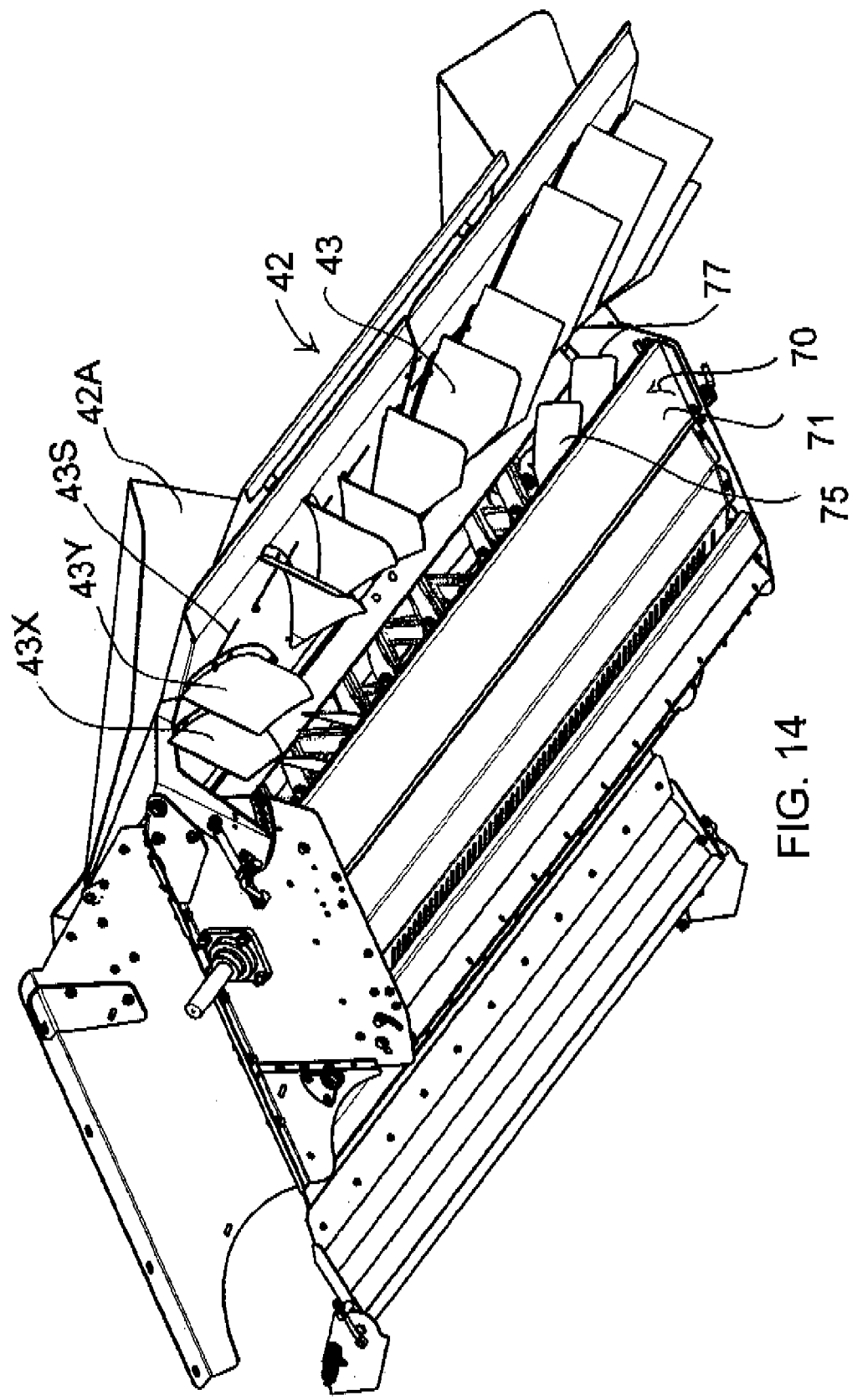
FIG. 14 is a isometric view from the underside showing the embodiment of FIGS. 11 and 12 in the position of FIG. 12.

As shown in FIG. 12, the adjustable discharge member 70 is moved to an inverted position so that if has an upper surface 74 which co-operates with the inside surface of the housing to guide the material flowing over that surface. Thus the smooth bottom surface 71 has now been moved to the underside and is replaced in its operating position by the upper surface 74. The upper surface 74 carries fins 75 which project upwardly. The fins as best shown in FIG. 14 are arranged in two pairs with each pair adjacent a respective side wall of the housing. Each pair is arranged with a leading edge 76 at the front of the adjustable discharge member 73 and the trailing edge 77 projecting outwardly beyond the rear edge of the discharge member. The leading edge is arranged axially towards the center of the rotor and then is inclined outwardly and rearwardly so as to tend to guide the material flowing over the bottom surface and within the rotor housing outwardly toward the side walls of the housing. The leading edge 76 is inclined upwardly and rearwardly so as to tend to shed any material which may collect on the leading edge.

Turning now to FIG. 13, further detail of the adjustable discharge member 70 can be seen. The adjustable discharge member in FIG. 13 is shown in the first position where the smooth surface 71 is presented to the material flowing over the inside surface 72 of the housing.

The adjustable discharge member is mounted for pivotal movement on a pin 80 so that is can rotate around the pin to present with the surface 71 upward or the surface 74 upwards. In the position shown in FIG. 13, we noted that the surface 71 follows the curvature of the surface 72. The adjustable discharge member is held in position by a pin 81 which engages in a slot 82 in a wall 83 of the member. Rotation from the position shown in FIG. 13 a clockwise direction carries a further slot 85 in a wall 86 around the pin 82 the pin 81 where is can again be locked in place. It should be noted that the position of the slot 82 and 85 be arranged such that in the position of FIG. 13 the surface 71 is inclined upwardly and rearwardly in the conventional part cylindrical surface. However when rotate in a clockwise direction to the position shown in FIG. 12, the surface 74 is moved to a horizontal position so that the trailing edge 74A which defines the trailing edge of the surface is moved downwardly relative to a trailing edge 71A of the surface 71 the position of FIG. 13. This downward movement of the trailing edge in the adjustment action causes the material discharging form the surface of the housing to discharge at a lower position so to accommodate the downward incline of the tailboard 42 in the position shown in FIG. 12.

The tailboard is adjusted by the hydraulic cylinder 44 and is locked in place by selection of a respective one of a plurality of locating holes 44A and a locking pin 44B.

Thus in the position of FIG. 12, the tailboard 42 is tilted downwardly to the position previously described and the guides within the combine housing are again adjusted so that the straw by-passes the chopper and is rotor and is instead passed as a swath over the upper surface of the tailboard 42 and the guide surfaces 42A.

In the position on FIG. 12 the chaff is feed into the chopper and engages the rotor blades therein to be carried around with the rotor for discharge through the open mouth 40 over the guide member 70 and its surface 74.

As the material being discharged in the position of FIG. 12 is primarily chaff, this chaff tends to relatively light and thus tend to float axially inwardly toward the center of the rotor away from the side walls of the housing. This occurs due to the increased air flow generated the side of the rotor by the construction shown in the above US application 2004/0043804. The fins 75 thus tend to reduce this axial movement of the chaff again returning it to back toward the side walls of the housing and over a full with of the rotor.

Thus the fins can be used in chaff since they fins could otherwise interfere with the flow of straw or other materials which could be trapped on the fins and thus the fins are highly desirable in the feeding of chaff to guide the chaff to the outside edges of the rotor at the side walls of the housing to provide the full width that do not interfere with the flow of the material since the material is chaff.

In the position of FIG. 12, the tailboard 42 is pivoted downwardly and the lower angle of discharge from the tailing edge 74A ensures that the material is fed onto the downwardly inclined tailboard and the underside carrying the fins 43 at a suitable angle to provide discharge of the chaff over a wide range.

Again as best shown in FIG. 14, two outside ones 43X and 43Y of the fins are adjusted by sliding the trailing edge outwardly in the respective guide slot 43S so as to increase the angle of the fin in the outward direction thus increases the angle of inclination from the leading edge to the trailing edge of the fin. This increase in incline of these two fins co-operates with the high velocity air flow at the sides of the housing is generated by the arrangement described in he above application so that a greatly increased air flow velocity is provided at this area so that the chaff adjacent the side walls exits the discharge opening 40 at a higher velocity and impacts upon the two outer most fins to provide the high spreading action of the chaff sufficient to spread the chaff over the required distance. At the same time the direct rearward orientation of the surface 74 smoothes the transition angle between the surface 74 and the downwardly inclined tailboard. The chaff board fins 75 are arranged to line up generally with the fins of the tailboard and thus direct more of the chaff to the outer fins 43X and 43Y where the air velocity is highest. The air then powers and spreads the chaff up to thirty feet in width.

The adjustment of the adjustable discharge member between the two conditions of the smooth upwardly inclined surface and the horizontal finned surface is obtained in the embodiment shown by rotation of a double sided member about a horizontal axis so as to present either the smooth surface upwardly or the finned upwardly.

However other techniques for adjustment can be provided. Thus the surface may be smooth in both conditions and merely titled downwardly to the required angle to the second condition for the chaff and then an attachment portion can be applied onto the structure to provide the fins which are carried as a separate element attached onto the upper surface of the adjustment member.

With further arrangement, two separate rear discharge members can be provided one which is attached in its required position as shown in FIG. 11 and then is removed and replaced by another which is attached in position in FIG. 12 as two entirely separate elements.

Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:

1. A combine harvester comprising:
   a main housing;
   a straw separating system mounted within the main housing for separating seed materials from straw for collection of the seed materials and for transport of the straw rearwardly toward a rear of the main housing for discharge;
   a sieve assembly mounted within the main housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;
   the main housing having a rear hood behind the rear edge of the sieve assembly with a bottom opening in the hood for discharge of the straw and the lighter materials;
   a chopper and discharge apparatus mounted at the rear hood and having a feed opening for receiving the straw and chaff from the combine harvester and for discharging the materials from the combine harvester;
   a chaff guide system operable for guiding the chaff into the feed opening;
   a straw guide system movable between a first operating condition guiding the straw into the feed opening and a second operating condition guiding the straw to bypass above the chopper and discharge apparatus;

the chopper and discharge apparatus comprising:

a chopper housing having said feed opening therein into which said straw and/or chaff can be fed from the combine harvester depending upon the positions of the chaff guide system and the straw guide system;

a chopping assembly mounted in the chopper housing and comprising a hub member mounted for rotation about a longitudinal axis of the hub member and a plurality of blade members mounted on the hub member for rotation therewith about said axis;

the chopper housing defining a discharge opening through which the chopped materials are discharged;

a tailboard having a plurality of guide fins;

the tailboard being adjustable between a first operating condition and a second downwardly inclined operating condition;

the tailboard being arranged such that, in the first operating condition, the chopped material from the discharge opening is directed onto the guide fins for guiding by the guide fins in a spread pattern;

the tailboard and the straw guide system being arranged such that, in the second operating condition, the tail board is inclined downwardly to cause the straw from the combine which has bypassed above the chopper and discharge apparatus to pass over the tailboard while inclined downwardly without contacting the fins for windrowing the straw;

the chopper housing having a guide surface thereof which is adjustable relative to the tailboard between a first position and a second position;

the guide surface being arranged, in the first position, for guiding straw onto the tailboard for spreading by the fins thereof;

the guide surface being arranged, in the second position such that, with the straw guide system in the second condition thereof and the chaff guide system in the first condition thereof, chaff entering the feed opening and engaging the chopping assembly is discharged from the chopper housing at a lower position than the straw is discharged in the first position.

2. The combine harvester according to claim 1 wherein the guide surface of the chopper housing comprises a bottom wall over which the chopped material passes to the discharge opening and wherein the guide surface defines a rear discharge edge which comprises a portion of the bottom wall and which is movable.

3. The combine harvester according to claim 2 wherein the rear discharge edge can pivot downwardly about a transverse pivot axis.

4. The combine harvester according to claim 1 wherein the chopper housing includes a plurality of chaff spreading fins arranged for engaging the chaff in the second position and arranged such that the straw avoids the chaff spreading fins when in the first position.

5. The combine harvester according to claim 4 wherein the chopper housing includes a rear discharge member which can be inverted to provide a first surface upwardly in the first position and a second surface upwardly in the second position.

6. The combine harvester according to claim 1 wherein the chopper housing includes a plurality of chaff spreading fins arranged for engaging the chaff in the second position, the chopper housing being adjustable such that the straw avoids the chaff spreading fins when in the first position.

7. The combine harvester according to claim 6 wherein the chaff spreading fins are adjustable between the first and second positions.

8. The combine harvester according to claim 6 wherein the chaff spreading fins are arranged in the second position to direct the chaff at least partly onto the tailboard.

9. The combine harvester according to claim 6 wherein the chaff spreading fins are arranged in the second position to direct the chaff onto outermost fins of the tailboard.

10. The combine harvester according to claim 8 wherein the tail board has at least the outermost fins thereof which can be adjusted so as to increase a spread angle thereof outwardly for use in the second position.

11. A combine harvester comprising:

a main housing;

a straw separating system mounted within the main housing for separating seed materials from straw for collection of the seed materials and for transport of the strew rearwardly toward a rear of the main housing for discharge;

a sieve assembly mounted within the main housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;

the main housing having a rear hood behind the rear edge of the sieve assembly with a bottom opening in the hood for discharge of the straw and the lighter materials;

a chopper and discharge apparatus mounted at the rear hood and having a feed opening for receiving the straw and chaff from the combine harvester and for discharging the materials from the combine harvester;

a chaff guide system operable for guiding the chaff into the feed opening;

a straw guide system movable between a first operating condition guiding the straw into the feed opening and a second operating condition guiding the straw to bypass above the chopper and discharge apparatus;

the chopper and discharge apparatus comprising:

a chopper housing having said feed opening therein into which said straw and/or chaff can be fed from the combine harvester depending upon the positions of the chaff guide system and the straw guide system;

a chopping assembly mounted in the chopper housing and comprising a hub member mounted for rotation about a longitudinal axis of the hub member and a plurality of blade members mounted on the hub member for rotation therewith about said axis;

the chopper housing defining a discharge opening through which the chopped materials are discharged;

a tailboard having a plurality of guide fins;

the tailboard being adjustable between a first operating condition and a second downwardly inclined operating condition;

the tailboard being arranged such that, in the first operating condition, the chopped material from the discharge opening is directed onto the guide fins for guiding by the guide fins in a spread pattern;

the tailboard and the straw guide system being arranged such that, in the second operating condition, the tail board is inclined downwardly to cause the straw from the combine which has bypassed above the chopper and discharge apparatus to pass over the tailboard while inclined downwardly without contacting the fins for windrowing the straw;

the chopper housing having a guide surface thereof which is adjustable relative to the tailboard between a first position and a second position;

the guide surface being arranged, in the first position, for guiding straw onto the tailboard for spreading by the fins thereof;

the guide surface being arranged, in the second position such that, with the straw guide system in the second condition thereof and the chaff guide system in the first condition thereof, chaff entering the feed opening and engaging the chopping assembly is discharged from the chopper housing at a lower position than the straw is discharged in the first position;

the chopper housing including a plurality of chaff spreading fins arranged for engaging the chaff in the second position;

the chopper housing being adjustable such that the straw avoids the chaff spreading fins when in the first position;

the chaff spreading fins being arranged in the second position to direct the chaff at least partly onto the tailboard for spreading thereby.

* * * * *